(12) United States Patent
Hewitt (10) Patent No.: US 12,314,544 B2
(45) Date of Patent: *May 27, 2025

(54) DYNAMIC WEB CONTENT BASED ON NATURAL LANGUAGE PROCESSING (NLP) INPUTS

(71) Applicant: Verint Americas Inc., Alpharetta, GA (US)

(72) Inventor: Timothy James Hewitt, Spokane Valley, WA (US)

(73) Assignee: Verint Americas Inc., Alpharetta, GA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/195,413

(22) Filed: May 10, 2023

(65) Prior Publication Data

US 2023/0280887 A1 Sep. 7, 2023

Related U.S. Application Data

(63) Continuation of application No. 16/850,315, filed on Apr. 16, 2020, now Pat. No. 11,681,416.

(Continued)

(51) Int. Cl.
*G06F 3/0484* (2022.01)
*G06F 16/242* (2019.01)
*G06F 16/9535* (2019.01)
*G06F 16/955* (2019.01)
*G06F 40/00* (2020.01)
(Continued)

(52) U.S. Cl.
CPC .......... *G06F 3/0484* (2013.01); *G06F 16/243* (2019.01); *G06F 16/9535* (2019.01); *G06F 16/9558* (2019.01); *G06F 40/00* (2020.01); *G06F 40/40* (2020.01); *G06N 5/043* (2013.01);
(Continued)

(58) Field of Classification Search
CPC ......... H04L 67/02; H04L 67/22; H04L 67/30; H04L 67/306; G10L 15/22; G06F 3/0484; G06F 16/9558; G06F 40/40; G06F 16/958; G06F 16/243; G06F 40/00; G06F 40/20; G06F 40/30; G06F 16/337;
(Continued)

(56) References Cited

U.S. PATENT DOCUMENTS 5,987,480 A 11/1999 Donohue et al.
6,085,229 A 7/2000 Newman et al.
(Continued)

OTHER PUBLICATIONS

Search Report and Written Opinion, dated Jul. 7, 2020, received in connection with International Patent Application No. PCT/US2020/028455.

*Primary Examiner* — Andrew L Tank
(74) *Attorney, Agent, or Firm* — Meunier Carlin & Curfman LLC (57) ABSTRACT

Systems and methods are provided for dynamically adjusting a website of an entity using information that has been received, stored, gathered, and/or otherwise obtained about what people want to find on the entity's website. A website may be dynamically adjusted using trending information in response to determining that the usage of the monitored data source is greater than the baseline usage distribution or in response to determining that the usage of the monitored data source is not greater than the baseline usage distribution receiving NLP inputs of the user from the IVA and adjusting dynamic web content displayed on the website based on the NLP inputs.

16 Claims, 5 Drawing Sheets

Related U.S. Application Data (60) Provisional application No. 62/839,108, filed on Apr. 26, 2019.

(51) Int. Cl.
| | |
|---|---|
| *G06F 40/40* | (2020.01) |
| *G06N 5/043* | (2023.01) |
| *H04L 67/02* | (2022.01) |
| *H04L 67/50* | (2022.01) |
| *G10L 15/22* | (2006.01) |

(52) U.S. Cl.
CPC ............ *H04L 67/02* (2013.01); *H04L 67/535* (2022.05); *G10L 15/22* (2013.01)

(58) Field of Classification Search
CPC .......... G06F 16/9535; G06F 16/90332; G06N 5/043; G06Q 30/0269
See application file for complete search history.

(56) References Cited

U.S. PATENT DOCUMENTS

| | | |
|---|---|---|
| 6,223,215 B1 | 4/2001 | Hunt et al. |
| 6,892,226 B1 | 5/2005 | Tso et al. |
| 7,627,536 B2 | 12/2009 | Kacmarcik |
| 7,975,020 B1 | 7/2011 | Green et al. |
| 8,489,599 B2 | 7/2013 | Bellotti |
| 9,547,369 B1 | 1/2017 | Wernick |
| 10,963,273 B2 | 3/2021 | Peng |
| 2009/0055385 A1 | 2/2009 | Jeon |
| 2011/0083079 A1 | 4/2011 | Farrell |
| 2011/0087966 A1 | 4/2011 | Leviathan |
| 2012/0023393 A1 | 1/2012 | Tomasic |
| 2012/0265528 A1 | 10/2012 | Gruber |
| 2013/0254374 A1 | 9/2013 | Bogdany |
| 2013/0297402 A1 | 11/2013 | Chen |
| 2015/0039622 A1 | 2/2015 | Sampath-Kumar |
| 2016/0225369 A1 | 8/2016 | Agrawal |
| 2016/0259775 A1 | 9/2016 | Gelfenbeyn |
| 2016/0379270 A1 | 12/2016 | Shah |
| 2017/0250930 A1 | 8/2017 | Ben-Itzhak |
| 2017/0269816 A1 | 9/2017 | Bradley |
| 2017/0337177 A1 | 11/2017 | Maxwell, III |
| 2018/0033040 A1 | 2/2018 | Minnis et al. |
| 2018/0096073 A1 | 4/2018 | Sun |
| 2018/0189402 A1 | 7/2018 | Mullaney |
| 2019/0005021 A1 | 1/2019 | Miller |
| 2019/0005024 A1 | 1/2019 | Somech et al. |
| 2019/0139092 A1 | 5/2019 | Nomula |
| 2019/0230170 A1 | 7/2019 | Marlin |
| 2019/0327331 A1 | 10/2019 | Natarajan |

DYNAMIC WEB CONTENT BASED ON NATURAL LANGUAGE PROCESSING (NLP) INPUTS

CROSS-REFERENCE TO RELATED APPLICATIONS

This application is a continuation of U.S. application Ser. No. 16/850,315, filed Apr. 16, 2020, which claims the benefit of priority to U.S. Provisional Patent Application No. 62/839,108, filed on Apr. 26, 2019, entitled "Dynamic Web Content Based on NLP Inputs," the contents of which are hereby incorporated by reference in its entirety.

BACKGROUND

A user generally goes to an intelligent virtual assistant (IVA) associated with a webpage when the user cannot easily find what the user wants on the webpage. A user may be frustrated when they cannot find what they want on the webpage, and may not want to have to interaction with an IVA. Additionally, an IVA may not be able to provide the information the user is searching for, resulting in an unsatisfactory user experience. It is desirable to provide the information or other content that a user wants on a webpage, so the user does not have to interact with an IVA to find that information or content.

SUMMARY

Systems and methods are provided for dynamically adjusting a website of an entity, such as a company or an organization, using information that has been received, stored, gathered, and/or otherwise obtained about what people want to find on the entity's website. A website may be dynamically adjusted using trending information. Dynamically adjusting may comprise generating and presenting links on the website to webpages in order of volume over a defined time threshold, or by variance over a standard volume over a longer established time frame. Dynamically adjusting the website may comprise providing an element on a website for what is most urgent to customers. A unit associated with a website may be monitored, and when the unit volume or activity starts to spike beyond normal expectations, then information about the unit is proactively and/or preemptively offered on the website, or a webpage of the website, without ever having a conversation with a user.

In an implementation, a system for providing dynamic web content is provided. The system comprises: an intelligent virtual assistant (IVA) configured to receive natural language processing (NLP) inputs from a user; and a computing device in communication with the IVA and configured to adjust content on a website based on the NLP inputs.

In an implementation, a method for providing dynamic web content is provided. The method comprises: obtaining data from at least one internal data source, at least one external data source, or intelligent virtual assistant (IVA) data comprising natural language processing (NLP) inputs from a user; monitoring the data for information pertaining to at least one of the user, other users, or an entity; analyzing the information; determining content to be placed on a website based on the analyzed information; and adjusting the website using the determined content.

In an implementation, a method for providing dynamic web content is provided. The method comprises: authenticating a user of a website; obtaining intelligent virtual assistant (IVA) data pertaining to the user; analyzing the data to determine at least one of activities of the user, interests of the user, activities of people who are similar to the user, interests of people who are similar to the user, trending content, or trending subject matter; determining subject matter or links or other content to be displayed on the website for the user based on the analyzed data; and adjusting the website using the determined subject matter or links or other content.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
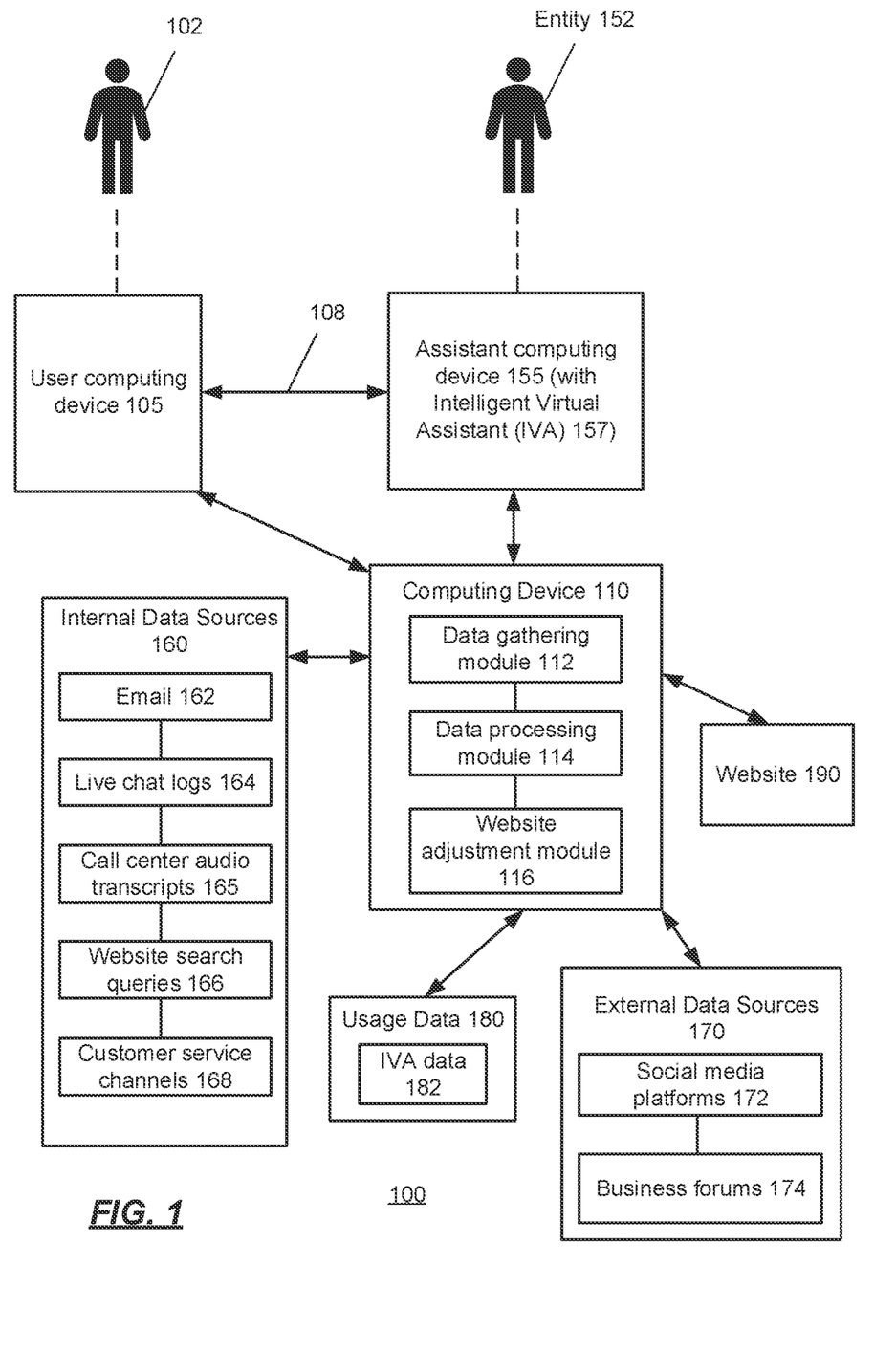
FIG. 1 is an illustration of an exemplary environment for providing dynamic web content based on natural language processing (NLP) inputs.

FIG. 1 is an illustration of an exemplary environment 100 for providing dynamic web content based on natural language processing (NLP) inputs and other data sources, such as internal data sources and/or external data sources. In an embodiment, an entity (such as a company or other organization) can tailor its website to its users dynamically based on information that has been received, stored, gathered, and/or otherwise obtained about what information, content, or other material that people want to find on the company's website based on data from an intelligent virtual assistant (IVA) and/or other data sources. Benefits include dynamic web content tailored to users, the ability to leverage user data to create dynamic content, and connecting NLP services to web content.

Aspects of the invention are relevant as an add-on to IVA/IVR (intelligent virtual assistant/interactive voice response) services, as a service is provided that presents web content that is more relevant to users based on how they use the site immediately without having to redesign the site after extensive (e.g., months) of analysis.

A user 102, using a user computing device 105, such as a smartphone, a tablet, or a laptop computer, communicates with an assistant computing device 155 associated with an entity 152 through a network 108 (e.g., the Internet). The entity 152 may be an individual or a business, company, or organization, for example, that provides a product or service, or access to a product or service, to the user 102 via the network 108. An example product or service may be a website (or showcased, displayed, or otherwise provided or referred to on the website), such as the website 190. Depending on the embodiment, the user 102 may access the website 190 using a web browser via the user computing device 105.

The user 102 may communicate with the assistant computing device 155 via the user computing device 105 and an intelligent virtual assistant (IVA) 157 of the assistant computing device 155. The user computing device 105 (and thus the user 102) may interact with the IVA 157 using NLP associated with, or implemented by, the IVA 157. Any known NLP methods may be used to interact with the user 102 and collect data pertaining to conversations, communications, and interactions between the user 102 (and the user computing device 105) and the IVA 157. In a natural language setting, in an implementation, a dataset of conversations from a helpline call or chat may be analyzed to identify problem areas of a service or a product, or identify likes, dislikes, or characteristics of one or more users.

Additionally, the user computing device 105, and thus the user 102, may interact with a computing device 110 of the entity 152, either directly through a network such as the network 108 or via the assistant computing device 155. In this manner, the user computing device 105, and thus the user 102, can access and interact with the website 190.

The computing device 110 may be in communication with the assistant computing device 155 and/or the user computing device 105 to monitor the speech in a voice call (i.e., the conversation) or other communication between the user computing device 105 and the assistant computing device 155 (e.g., the IVA 157). The computing device 110 may be implemented in, or embodied in, a desktop analytics product or in a speech analytics product, in some implementations.

The computing device 110 may include a data gathering module 112, a data processing module 114, and a website adjustment module 116. In some implementations, the computing device 110 may be comprised within the assistant computing device 155. In some implementations, one or more of the data gathering module 112, the data processing module 114, or website adjustment module 116 may be comprised within the assistant computing device 155 or another computing device (not shown).

The network 108 may be a variety of network types including the public switched telephone network (PSTN), a cellular telephone network, and a packet switched network (e.g., the Internet). Although only one user computing device 105, one assistant computing device 155, and one computing device 110 are shown in FIG. 1, there is no limit to the number of computing devices 105, 155, 110 and telephones 106 that may be supported.

Figure 5:
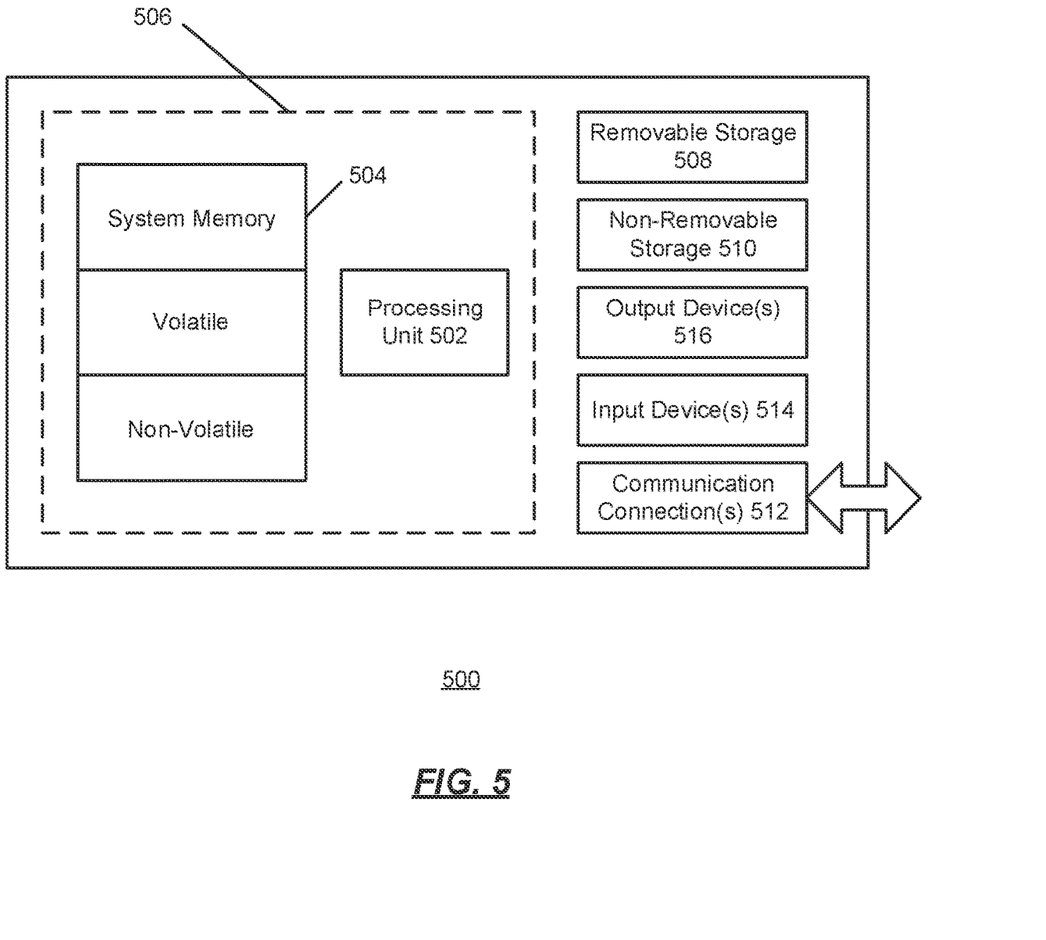
FIG. 5 shows an exemplary computing environment in which example embodiments and aspects may be implemented.

The user computing device 105, the assistant computing device 155, and the computing device 110, may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 5 as the computing device 500.

In some implementations, the computing device 110 is in communication with, and is configured to receive data from, one or more internal data sources 160 and/or one or more external data sources 170, as well as usage data 180 comprising IVA data 182. Depending on the implementation, the usage data 180 may be stored in the internal data sources 160, the external data sources 170, or other storage associated with and accessible by the computing device 110. The computing device 110 is also configured to access, and/or provide access to, the website 190. The IVA data 182 may be data collected from user interaction with the IVA 157 and/or any gathered and/or processed data from the IVA 157 such as from artificial intelligence (AI), machine learning (ML), advanced speech technologies (e.g., natural language understanding (NLU)/NLP/natural language generation (NLG)), and simulated live and unstructured cognitive conversations for involving voice, text, and/or digital interactions, for example. The IVA 157 may cover a variety of media channels in addition to voice, including, but not limited to social media, email, SMS/MMS, IM, etc.

The data gathering module 112 is configured to gather, obtain, or otherwise receive data from the internal data sources 160, the external data sources 170, and the usage data 180 comprising the IVA data 182. The internal data sources 160 may comprise one or more of email 162, live chat logs, call center audio transcripts 165, website search queries 166, and customer service channels 168, for example. The external data sources 170 may comprise social media platforms 172 and/or business forums 174, for example.

The data processing module 114 of the computing device 110 uses the internal data sources 160, the external data sources 170, and/or the usage data 180 to determine information such as trends, occurrences, volumes, and/or times of subject matter including news events, places, people, etc., and to determine subject matter based on the information.

The website adjustment module 116 of the computing device 110 adjusts content on the website 190 based on the determined subject matter. The adjusted content may include links to particular services, products, articles, etc. When a user 102 accesses the website 190 via the user computing device 105, the adjusted content can be generated and/or displayed to the user 102 on the website.

In an implementation, links to pages associated with one or more units (e.g., the top three units at that moment) are given positional prominence (e.g., based on volume or information pertaining to what a specific user traditionally uses an IVA or IVR system for). The company (e.g., an administrator of the company) may have the ability to determine and/or adjust the display and its content (e.g., maybe the company does not want to show some links or pages), including text, links, and styles.

In some implementations, data may be retrieved by the data gathering module 112 of the computing device 110 from the internal data sources 160, the external data sources 170, and the usage data 180, and analyzed by the data processing module 114 to determine the user's activities and/or interests, and/or activities and/or interests of other people who are similar to the user (e.g., based on demographics, anonymized data, user characteristics and/or population segment analysis, etc.), as well as trending content or subject matter (such as latest news or weather for a local area (e.g., where the user 102 is located) or for a widespread area such as nationally or internationally). Content based on the analysis is determined and placed on the website (e.g., on one or more pages of the website, such as a website landing page and/or a homepage) by the website adjustment module 116, either specific for the user 102 or more generally for a plurality of users who may access the website 190. The content may include links to additional content. HTML elements on the website may be filled with text and/or links directed to the content. The content may be displayed for a predetermined length of time or until a predetermined event occurs, for example.

Figure 2:
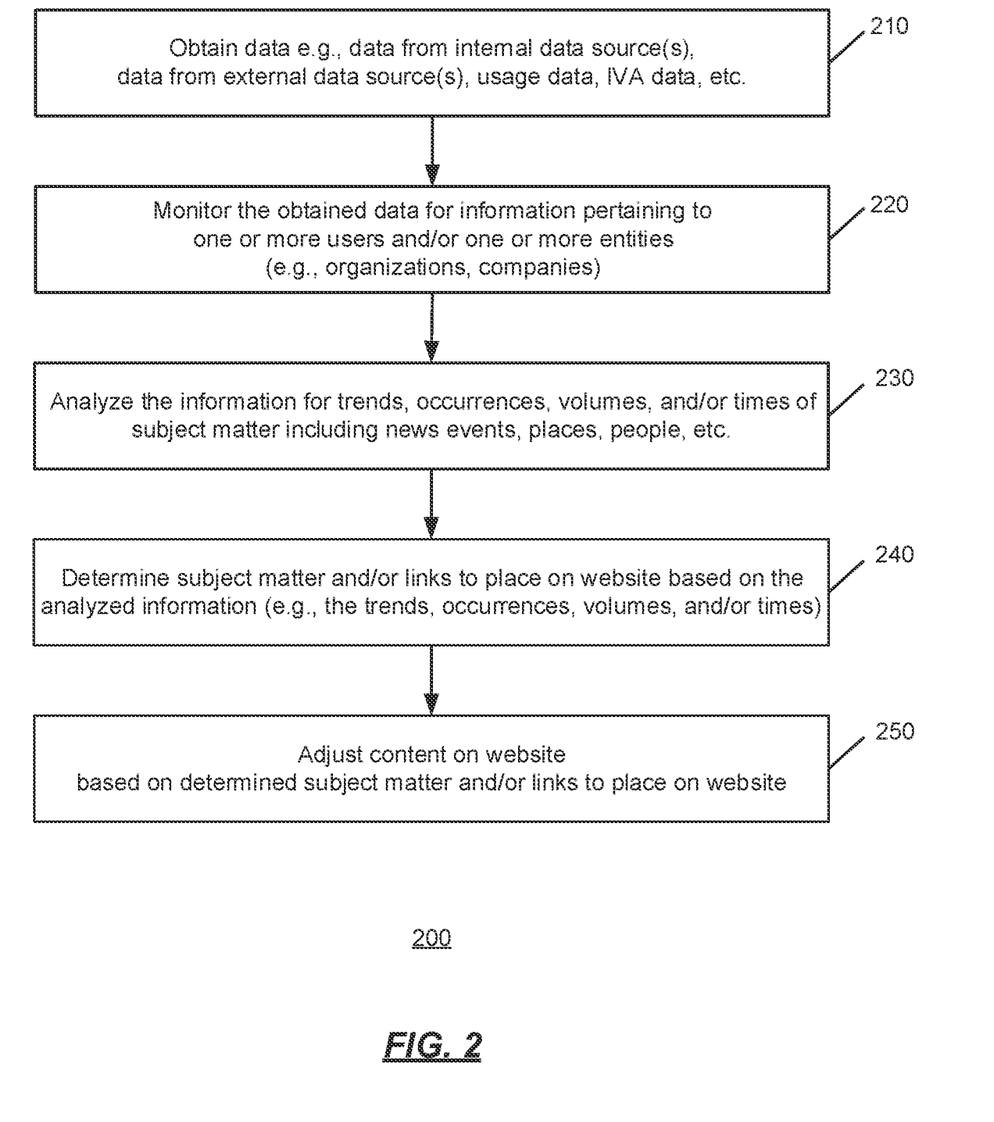
FIG. 2 is an operational flow of an implementation of a method of providing dynamic web content based on NLP inputs.

FIG. 2 is an operational flow of an implementation of a method 200 of providing dynamic web content based on NLP inputs. Aspects of the method 200 may be performed by the computing device 110 in some implementations.

At 210, a computing device obtains data, such as data from internal source(s), data from external source(s), usage data, and/or IVA data. In some implementations, the data gathering module 112 of the computing device 110 may obtain data from the internal data sources 160, the external data sources 170, and the usage data 180 comprising the IVA data 182.

At 220, the obtained data is monitored, e.g., by the data processing module 114 of the computing device 110, for information pertaining to one or more users (such as the user 102 and/or other users) and/or one or more entities (e.g., an organization or a company associated with the entity 152, an organization or a company associated with the website 190, etc.).

At 230, the information is analyzed, e.g., by the data processing module 114 of the computing device 110, for trends, occurrences, volumes, and/or times of subject matter including news events, places, people, etc. The subject matter may be directed to, or otherwise related to, the user, other users, the entity or organization (e.g., an organizational name), other entities or organizations, or other subject matter, depending on the implementation.

At 240, content to be placed on the website is determined based on the analyzed information. The content may be determined by the data processing module 114 of the computing device 110, in some implementations. The content may comprise subject matter and/or links to content related to the subject matter.

At 250, the content on the website is adjusted based on the determined subject matter and/or links. In some implementations, the website content of the website 190 may be adjusted by the website adjustment module 116 of the computing device 110.

Figure 3:
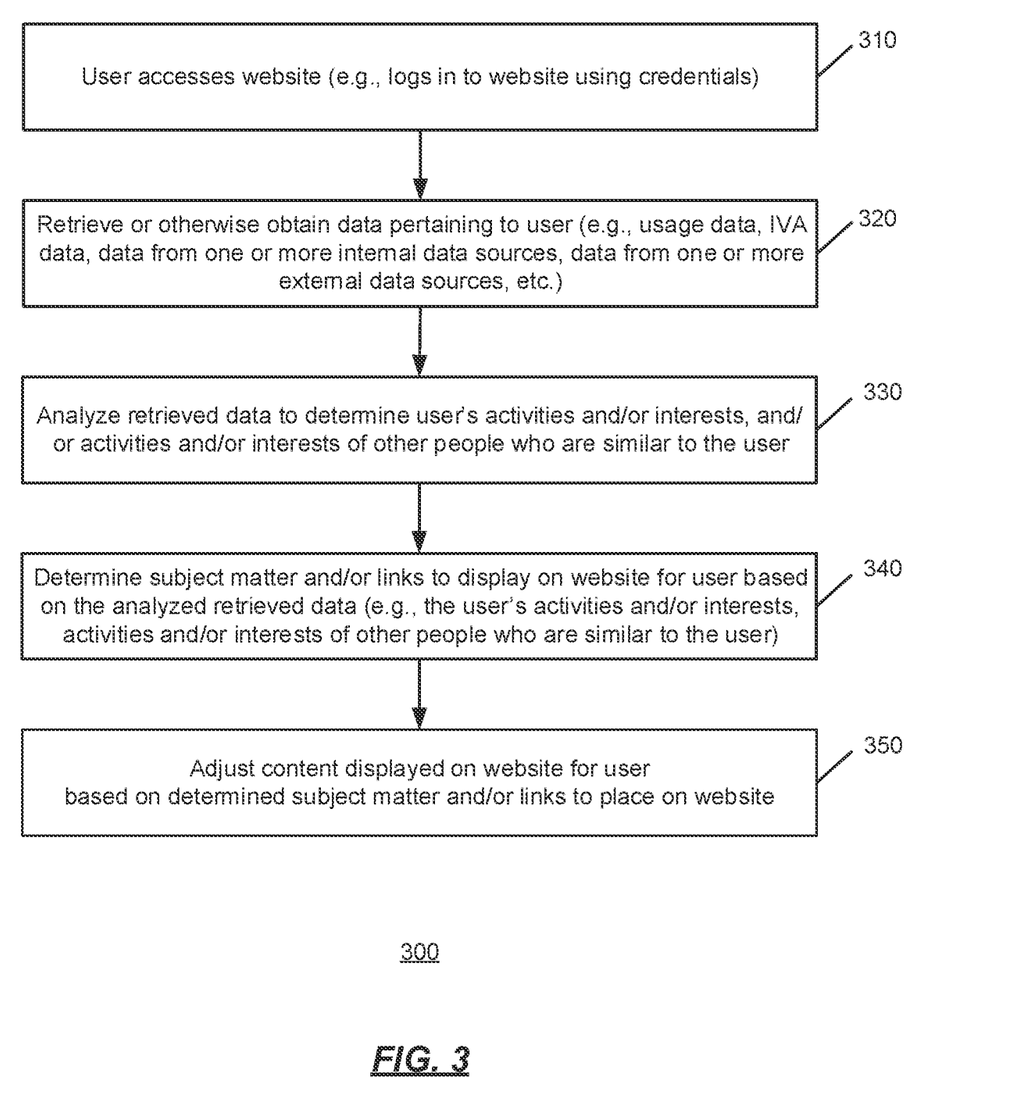
FIG. 3 is an operational flow of an implementation of a method of providing dynamic web content based on NLP inputs.

FIG. 3 is an operational flow of an implementation of a method 300 of providing dynamic web content based on NLP inputs. Aspects of the method 300 may be performed by the computing device 110 in some implementations.

At 310, a user, such as the user 102 using the user computing device 105, accesses a website, such as the website 190, e.g., by logging in to the website using credentials that identify and authenticate the user.

At 320, data pertaining to the user is retrieved or otherwise obtained from one or more data sources, such as internal data sources, external data sources, usage data, IVA data, etc. In some implementations, the data may be retrieved (or obtained) by the data processing module 114 of the computing device 110 from the internal data sources 160, the external data sources 170, and the usage data 180 comprising the IVA data 182.

At 330, the retrieved data is analyzed, for example by the data processing module 114 of the computing device 110 in some implementations, to determine the user's activities and/or interests, and/or activities and/or interests of other people or users who have similar characteristics as the user.

At 340, the subject matter and/or links or other content to be displayed on the website for the user are determined, based on the analyzed retrieved data (e.g., based on the user's activities and/or interests, and/or activities and/or interests of other people or users who have similar characteristics as the user). The data processing module 114 of the computing device 110 may determine the subject matter and/or links or other content to be displayed.

At 350, the content on the website is adjusted based on the determined subject matter and/or links. In some implementations, the website content of the website 190 may be adjusted by the website adjustment module 116 of the computing device 110.

Figure 4:
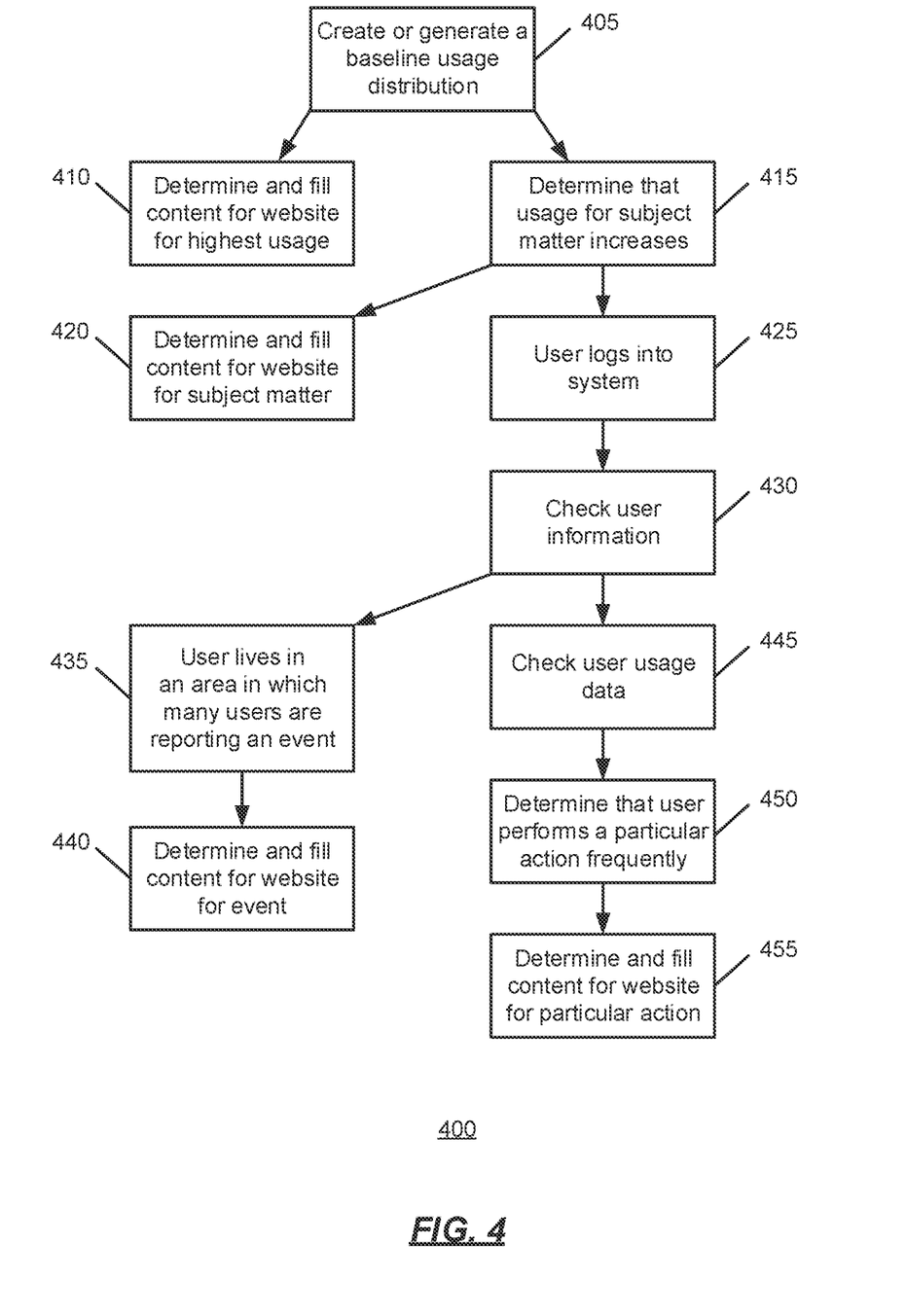
FIG. 4 is an operational flow of an implementation of a method of providing dynamic web content based on NLP inputs.

FIG. 4 is an operational flow of an implementation of a method 400 of providing dynamic web content based on NLP inputs. Aspects of the method 400 may be performed by the computing device 110 in some implementations.

At 405, a baseline usage distribution of users and/or subject matter is created or otherwise generated by a computing device retrieving and analyzed data from one or more data sources, such as internal data sources, external data sources, usage data, IVA data, etc. In some implementations, the data may be retrieved (or obtained) by the data processing module 114 of the computing device 110 from the internal data sources 160, the external data sources 170, and the usage data 180 comprising the IVA data 182.

At 410, the data processing module 114 may analyze the data to determine the subject matter that may be most relevant or desirable to the broadest group of users (e.g., using the baseline distribution usage), and then determine and/or generate website content accordingly based on that subject matter. The content of the website is adjusted to contain the website content from 405. In some implementations, this may comprise filling an HTML element on the webpage of the website with text and/or one or more links for highest usage (e.g., the highest usage subject matter across the users).

Meanwhile, at 415, one or more data sources are monitored, and it may be determined that the usage for particular subject matter increases. A user generally goes to an IVA associated with a webpage when the user cannot easily find what the user wants on the webpage. According to aspects of the invention, an element on a website is provided for content, information, or other subject matter that is most urgent to customers. So if data pertaining to particular subject matter that is being monitored starts to spike beyond normal expectations, then that information is proactively and/or preemptively offered on the website, or a webpage of the website, without ever having a conversation with the user or other users. At 420, content for the website is determined based on the subject matter that is seeing an increase in usage, and the website is adjust to contain this content. In some implementations, the website content is adjusted by filling an HTML element on the webpage of the website with text and/or one or more links for the particular subject matter.

In some implementations, links are presented in order of volume over a defined time threshold, or by variance over a standard volume over a longer established time frame. So if there is a sudden spike in a unit, like when a hurricane is approaching New Zealand, it may not be the top in volume but the high deviation from standard would trigger the dynamic link to information about a hurricane approaching New Zealand.

At some point, at 425, a user logs into the system, such as the user 102 logging into the website 190 using an identifier and/or other credentials. At 430, information pertaining to the user is checked or obtained, e.g., from one or more data sources, such as internal data sources, external data sources, usage data, IVA data, etc. In some implementations, the data may be retrieved (or obtained) by the data processing module 114 of the computing device 110 from the internal data sources 160, the external data sources 170, and the usage data 180 comprising the IVA data 182.

Data, subject matter, or other information about the user may be identified as having trending or spiked usage. For example, at 435, it may be determined that the user lives in an area in which many other users are reporting an event. If this is the case (that data, subject matter, or other information about the user is identified as having trending or spiked usage), at 440, the website content is adjusted to contain content that is directed, related to, and/or relevant to the event shown to be having trending or spiked usage. In some implementations, the website content is adjusted by filling an HTML element on the webpage of the website with text and/or one or more links for the event.

At 445, usage data of the user is checked to determine the various actions, requests, comments, interactions, etc. that the user has engaged in with respect to the system, the website, the entity (e.g., the company or organization), and the IVA, for example, in the past. This may be performed by the computing device 110 retrieving the usage data 180 and/or data from the internal data sources 160.

At 450, it is determined that the user performs a particular action (or request, comment, or interaction) frequently (e.g., more frequently than other actions, more recently than other actions, frequently enough that the number of times the action has been performed by the user in the past exceed a predetermined threshold, etc.).

At 455, the website content is adjusted to contain content that is directed, related to, and/or relevant to the particular action that the user frequently performs. In some implementations, the website content is adjusted by filling an HTML element on the webpage of the website with text and/or one or more links for the particular action.

For example, a user accesses the website (e.g., logs in) and because it is determined that the user has asked in a previous session to check their balance, a link is immediately and automatically provided on the website to check the user's balance. As another example, if the user only did that once, but the last few sessions the user wanted to check an order status, a link is presented on the website to the user to check their order status. Some implementations may use a unique user identifier (ID) for the user and a unit (e.g., action, request, comment, interaction, etc.) hit counter maintained in storage and updated as the user continues to interact with the system, the website, the entity (e.g., the company or organization), and the IVA.

Other units, like disputing transactions, may be bad for brand image, so that unit may not be allowed to be presented in the dynamically created links.

Availability, like text and style, would be handled like another response condition in the unit.

Thus, systems and methods are provided for dynamically adjusting a website using information that has been received, stored, gathered, and/or otherwise obtained about what people want to find on the website. A website may be dynamically adjusted using trending information. Dynamically adjusting may comprise generating and presenting links on the website to webpages in order of volume over a defined time threshold, or by variance over a standard volume over a longer established time frame. Dynamically adjusting the website may comprise providing an element on a website for what is most urgent to customers. A unit associated with a website may be monitored, and when the unit volume or activity starts to spike beyond normal expectations, then information about the unit is proactively and/or preemptively offered on the website, or a webpage of the website, without ever having a conversation with a user.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for providing dynamic web content is provided. The system includes: an intelligent virtual assistant (IVA) configured to receive natural language processing (NLP) inputs from a user; and a computing device in communication with the IVA and configured to adjust content on a website based on the NLP inputs.

Implementations may include some or all of the following features. The system further comprises at least one of an internal data source or an external data source, wherein the computing device is configured to receive data from the internal data source or the external data source and further adjust the content on the website based on the received data. The internal data source comprises at least one of email, live chat logs, call center audio transcripts, website search queries, and customer service channels, and wherein the external data source comprises at least one of social media platforms or business forums. The computing device is configured to use at least one of the internal data source, the external data source, or usage data to determine information comprising at least one of trends, occurrences, volumes, or times of subject matter comprising news events, places, or people, and to further adjust the content on the website based on the determined information. The computing device is configured to further adjust the content on the website based on at least one of activities of the user, interests of the user, activities of people who are similar to the user, interests of people who are similar to the user, trending content, or trending subject matter. The computing device is configured to adjust the content on the website based on past usage data of at least the user or other users. The computing device is configured to dynamically tailor the content on the website to the user based on an identification of the user. The website is associated with an entity that provides a product or a service to the user. The NLP inputs are based on previous natural language conversations between the user and the IVA. Adjusting the content on the website comprises generating and presenting links on the website to webpages in order of volume over a defined time threshold, or by variance over a standard volume over a longer established time frame. Adjusting the content on the website comprises dynamically adjusting the website comprises providing an element on a website for what is most urgent to users. The computing device is configured to monitor a unit associated with the website, and when the unit volume or activity starts to spike beyond normal expectations, then information about the unit is proactively or preemptively offered on the website, or a webpage of the website, without ever having a conversation with the user.

In an implementation, a method for providing dynamic web content is provided. The method includes obtaining data from at least one internal data source, at least one external data source, or intelligent virtual assistant (IVA) data comprising natural language processing (NLP) inputs from a user; monitoring the data for information pertaining to at least one of the user, other users, or an entity; analyzing the information; determining content to be placed on a website based on the analyzed information; and adjusting the website using the determined content.

Implementations may include some or all of the following features. Analyzing the information comprises analyzing the information for at least one of trends, occurrences, volumes, or times of subject matter comprising news events, places, or people. The subject matter is directed to the user, other users, the entity, or other entities or organizations. Adjusting the website comprises displaying on the website at least one of subject matter or links to content related to the subject matter.

In an implementation, a method for providing dynamic web content is provided. The method includes: authenticating a user of a website; obtaining intelligent virtual assistant (IVA) data pertaining to the user; analyzing the data to determine at least one of activities of the user, interests of the user, activities of people who are similar to the user, interests of people who are similar to the user, trending content, or trending subject matter; determining subject matter or links or other content to be displayed on the website for the user based on the analyzed data; and adjusting the website using the determined subject matter or links or other content.

Implementations may include some or all of the following features. The method further comprises obtaining data from at least one of an internal data source, an external data source, or usage data, wherein analyzing the data further comprises analyzing the obtained data. The IVA data comprises natural language processing (NLP) inputs from the user. The trending subject matter is directed to the user, other users, the entity, or other entities or organizations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system for providing dynamic web content, the system comprising:
   an intelligent virtual assistant (IVA); and
   a computing device in communication with the IVA and configured to:

determine a baseline usage distribution of a data source associated with a website;

monitor usage of the data source associated with the website;

determine whether a usage of the monitored data source is greater than the baseline usage distribution;

in response to determining that the usage of the monitored data source is greater than the baseline usage distribution:

adjust dynamic web content displayed on the website to include information from the monitored data source before the IVA receives any natural language processing (NLP) inputs from a user of the website; and in response to determining that the usage of the monitored data source is not greater than the baseline usage distribution receive NLP inputs of the user from the IVA and adjust dynamic web content displayed on the website based on the NLP inputs.

2. The system of claim 1, further comprising at least one of an internal data source or an external data source, wherein the computing device is configured to receive data from the internal data source or the external data source and to adjust the dynamic web content displayed on the website based on the received data.

3. The system of claim 2, wherein the internal data source comprises at least one of email, live chat logs, call center audio transcripts, website search queries, and customer service channels, and wherein the external data source comprises at least one of social media platforms or business forums.

4. The system of claim 2, wherein the computing device is configured to use at least one of the internal data source, the external data source, or usage data to determine information comprising at least one of trends, occurrences, volumes, or times of subject matter comprising news events, places, or people, and to further adjust the dynamic web content displayed on the website based on the determined information.

5. The system of claim 1, wherein the computing device is configured to further adjust the dynamic web content displayed on the website based on at least one of activities of the user, interests of the user, activities of people who are similar to the user, interests of people who are similar to the user, trending content, or trending subject matter.

6. The system of claim 1, wherein the computing device is configured to adjust the dynamic web content displayed on the website based on past usage data of at least the user or other users.

7. The system of claim 1, wherein the computing device is configured to dynamically tailor the dynamic web content displayed on the website to the user based on an identification of the user.

8. The system of claim 1, wherein the website is associated with an entity that provides a product or a service to the user.

9. The system of claim 1, wherein the NLP inputs are based on previous natural language conversations between the user and the IVA.

10. The system of claim 1, wherein adjusting the dynamic content displayed on the website comprises generating and presenting links on the website to webpages in order of volume over a defined time threshold, or by variance over a standard volume over a longer established time frame.

11. The system of claim 1, wherein the computing device is configured to adjust the website by providing an element with a link to data of the monitored data source.

12. A method for providing dynamic web content, the method comprising:

determining a baseline usage distribution of a data source associated with a website;

monitoring usage of the data source associated with the website;

determining whether a usage of the monitored data source is greater than the baseline usage distribution;

in response to determining that the usage of the monitored data source is greater than the baseline usage distribution:

adjusting dynamic web content displayed on the website to include information from the monitored data source before an intelligent virtual assistant (IVA)-receives any natural language processing (NLP) inputs from a user of the website; and in response to determining that the usage of the monitored data source is not greater than the baseline usage distribution receiving NLP inputs of the user from the IVA and adjusting dynamic web content displayed on the website based on the NLP inputs.

13. The method of claim 12, further comprising receiving data from an internal data source or an external data source and adjusting the dynamic web content displayed on the website based on the received data.

14. The method of claim 13, wherein the internal data source comprises at least one of email, live chat logs, call center audio transcripts, website search queries, and customer service channels, and wherein the external data source comprises at least one of social media platforms or business forums.

15. The method of claim 12, the method comprising adjusting dynamic web content displayed on the website based on at least one of activities of the user, interests of the user, activities of people who are similar to the user, interests of people who are similar to the user, trending content, or trending subject matter.

16. The method of claim 15, wherein the trending subject matter is directed to the user, other users, or other entities or organizations.

* * * * *